Figure 1:
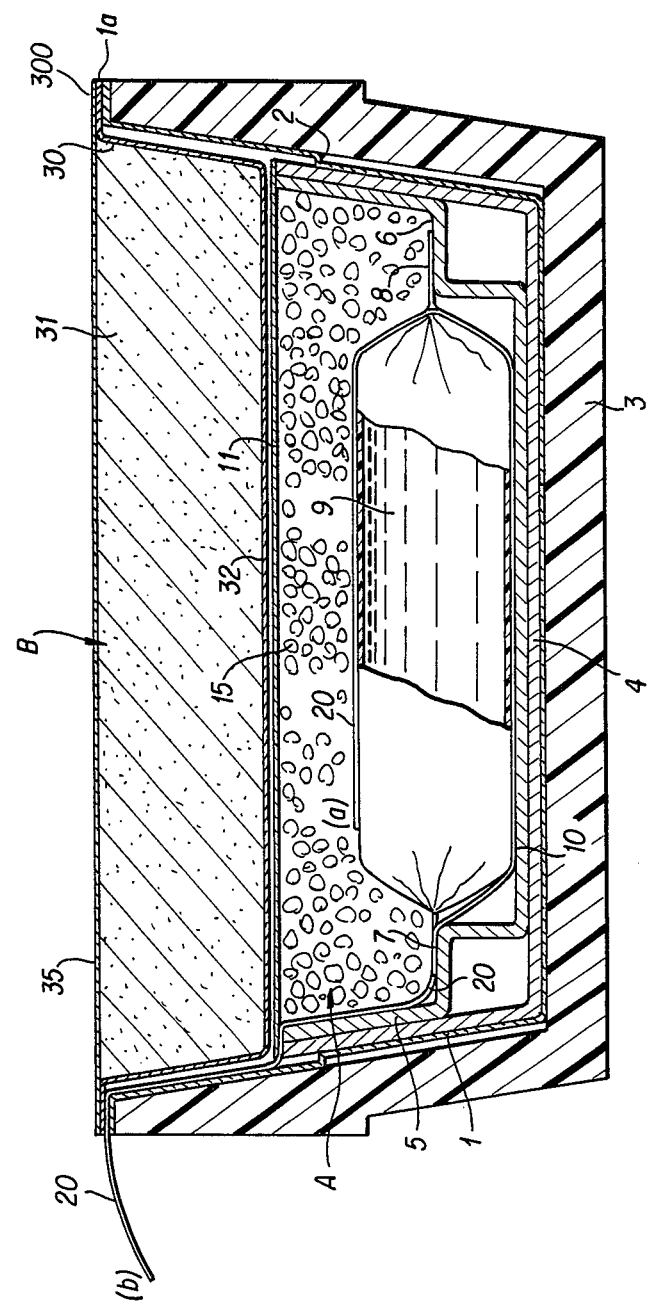

United States Patent [19]

Doukhan et al.

[11] Patent Number: 4,771,761
[45] Date of Patent: Sep. 20, 1988

[54] FOOD RECEPTACLE COMPRISING A REHEATING DEVICE BY EXOTHERMAL REACTION OF TWO REACTIVE PRODUCTS

[76] Inventors: Jacques Doukhan, 15 rue Vincent Rouillé, 56000 Vannes; Yves Bourgueil, Kerverho, 56610 Arradon, both of France

[21] Appl. No.: 44,494
[22] PCT Filed: Jul. 16, 1986
[86] PCT No.: PCT/FR86/00253
  § 371 Date: Mar. 23, 1987
  § 102(e) Date: Mar. 23, 1987
[87] PCT Pub. No.: WO87/00409
  PCT Pub. Date: Jan. 29, 1987

[30] Foreign Application Priority Data

Jul. 23, 1985 [FR] France ............... 8511352

[51] Int. Cl.⁴ .............................. F24J 1/02
[52] U.S. Cl. ..................... 126/263; 126/246
[58] Field of Search ............. 126/263, 264, 204, 206, 126/262, 261; 252/70; 220/201, 353

[56] References Cited

U.S. PATENT DOCUMENTS

| | | | |
|---|---|---|---|
| 2,733,709 | 2/1956 | Sukacev | 126/263 |
| 3,094,981 | 6/1963 | Brewer | 126/263 |
| 3,683,889 | 8/1972 | Hoffman | 126/263 |
| 3,871,357 | 3/1975 | Grosso et al. | 126/263 |
| 4,559,921 | 12/1985 | Benmussa | 126/263 |

FOREIGN PATENT DOCUMENTS

| | | |
|---|---|---|
| 0031523 | 7/1981 | European Pat. Off. |
| 0079286 | 5/1983 | European Pat. Off. |
| 2348121 | 11/1977 | France |
| 553692 | 9/1974 | Switzerland |

Primary Examiner—James C. Yeung
Attorney, Agent, or Firm—Oblon, Fisher, Spivak, McClelland & Maier

[57] ABSTRACT

The receptacle (1) is comprised of two parts (A) and (B) containing, on the one hand the heater (5) and on the other hand a canned food product (30). A ladle (9) containing water rests on the bottom of the heater (5). A strip (20) enables to tear the ladle (9) without touching the cover (11) which keeps its function of isolating the two volumes (A) and (B) while cooperating with the bottom (32) of the food canned (30) to transmit by conduction and radiation the calories emitted during the exothermal reaction. A flange of the receptacle (11) enables to seal all along its contour the can (30) and an out== isolating package (3) enables to handle the receptacle (1) without any risk during the operation of the heater (5). The sealing of the assembly is completed by a wax or compound seal at the outlet of the strip (20). The invention applies both to the domestic and collective catering.

10 Claims, 3 Drawing Sheets

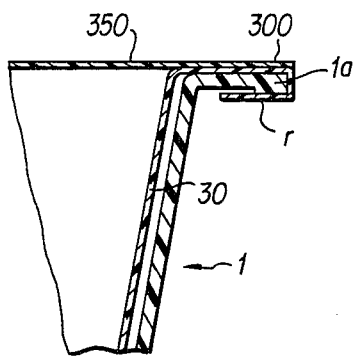
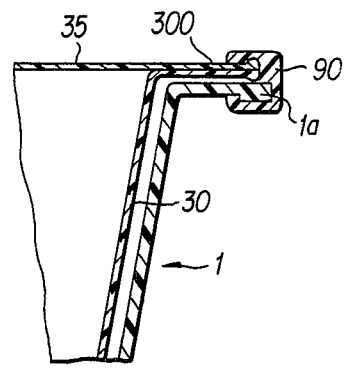
FIG. 4
FIG. 5
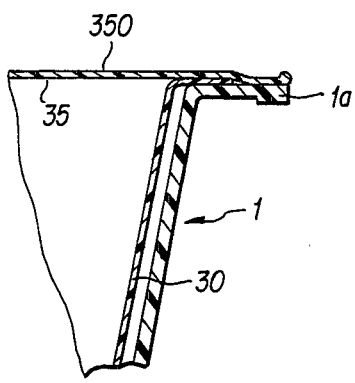
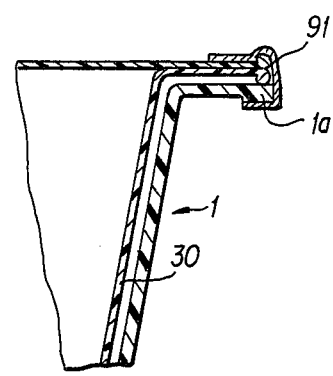
FIG. 6
FIG. 7

FOOD RECEPTACLE COMPRISING A REHEATING DEVICE BY EXOTHERMAL REACTION OF TWO REACTIVE PRODUCTS

The invention relates to a food tray including a heating device using the exothermic reaction of two reactive products.

Heating foods, culinary preparations, drinks in particular is known using the exothermic reaction for example of quick lime and water. Although the principle is simple, because it is based on a chemical reaction whose equation is known, on the other hand the practical application thereof is much less so. Numerous devices have been provided, but all come up against a few major problems: safety in operation on the one hand and efficiency on the other.

In so far as safety in operation is concerned, the reaction must take place more especially without the risk of burning for the user and the product to be consumed must be isolated sealingly from the reactive products and finally there must be good preservation of this product through insulation, also as tight as possible, from the external medium.

As for the efficiency, all depends on the reaction itself which must be complete, with optimized heat exchanges between the heater and the foods.

The aim of the present invention is to overcome all these problems. It relates more precisely to a food tray equipped with a reliable and efficient independent heater, in which the product to be heated is perfectly protected against any aggression from the reactive products, but on the other hand is in perfect thermal contact with the heat from the exothermic reaction, without it being necessary to use for this heating the steam released during the reaction which, moreover, only occurs for a very short time and proves insufficient.

It also relates to such a tray adapted for sealed closure of the whole which ensures good preservation thereof.

It relates finally to a tray cooperating with an insulating packing (external skirt) which allows the user, without the risk of burning, to handle the tray during and after heating.

The invention relates more precisely to a food tray including a heating device using the exothermic reaction of two reactive products, characterized in that the two parts or volumes (A) and (B) of the tray (1) receiving respectively the heater and the food receptacle are separated by a cover which provides insulation between the two parts (A) and (B) before and during the reaction while cooperating with the bottom of the food receptacle so as to ensure, by contact, the conduction and radiation of the heat from the heater towards the products to be heated contained in said receptacle, this latter having a profile complementary to the inner profile of part (B) of the container and its periphery while itself being closed by a lid isolating the contents of the food receptacle from the outside.

Figure 2:
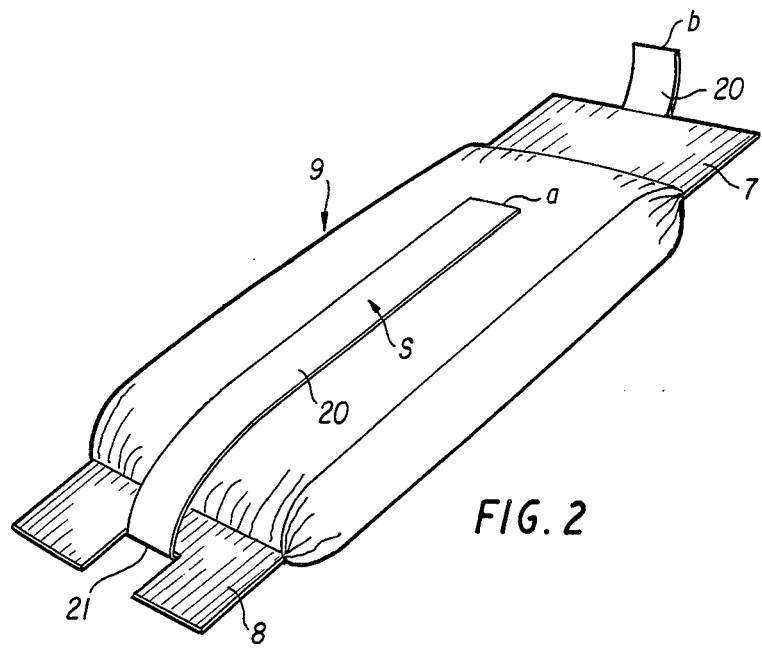
Figure 3:
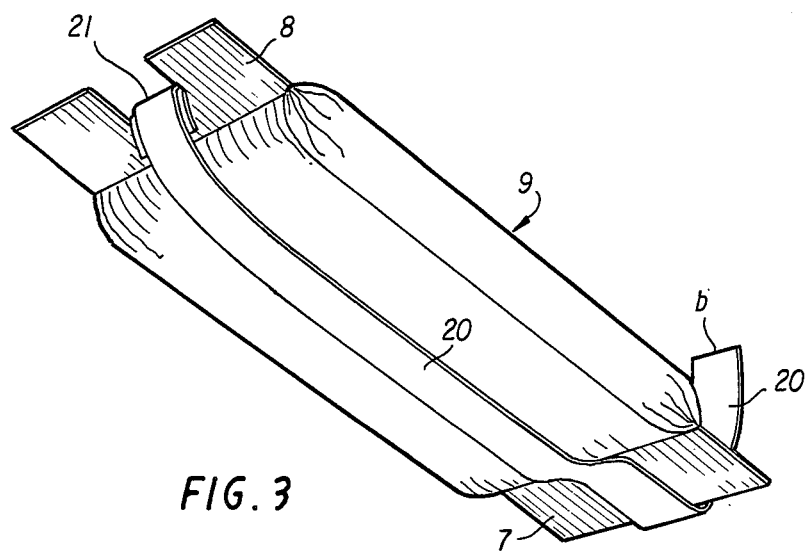

The invention will be better understood from the following explanations and the accompanying Figures in which:

FIG. 1 illustrates schematically the architecture of the different means used in a tray according to the invention, FIGS. 2 and 3 illustrate the position of the tongue for opening the water pocket, and FIGS. 4 to 7 show different variants for the sealed external closure of said container.

For the sake of clarity, the same elements bear the same references in all the Figures.

As shown in FIG. 1, a tray 1 includes two parts: the first A containing the heater properly speaking and the second B containing the food receptacle or preserve. According to an important feature of the invention, this tray 1, made for example from polypropylene, includes a shoulder 2 which serves as support point when this tray is inserted in an external packing 3 made for example from polystyrene whose function is to isolate the user thermally from said tray 1 when the heater is operating. To further improve the heat insulation and according to yet another feature of the invention, the inside of tray 1 is lined with an equally insulating material, such as cardboard. This lining 4 is in the form of a box and rests on the bottom of part A. The heater properly speaking is formed by a coated or complexed aluminium container 5. This container has a shoulder 6 on which bear two wings 7 and 8 integral with a sealed pocket 9 which rests on the bottom 10 of said container 5. A cover 11 hermetically closes this part A corresponding to heater 5. Pocket 9 contains one of the mutually isolated reactive products, in this case water, whereas in a part of the free volume of the heater 5 situated above pocket 9 is disposed the second reagent, for example quick lime 15.

According to another important feature of the invention, and as shown more particularly in FIGS. 2 and 3 showing the pocket 9, seen respectively from the top and from the bottom, the pocket 9 is equipped with means for comingling the reactive products in the form of an opening ribbon 20 which surrounds it. An end a of this ribbon is bonded or welded to the upper part of the pocket at the level of a zone S. The ribbon is folded back on one side of the pocket 9 in which a breakage zone 21 has been formed. This ribbon 20 passes freely round the lower face of pocket 9 so as to extend outwardly beyond the other wing. The other end b of ribbon 20 extends then (FIG. 1) outwardly of heater 5 while passing through, without damaging it, a first seal formed between the cover 11 and heater 5, this seal being for example made from wax and allowing free sliding of ribbon 20.

The part B of the tray 1 receives the food preserve (FIG. 1) or receptacle (both bearing the reference 30) containing the product 31 to be heated, closed for the preserve by a presealed lid 35 and for the receptacle by a lid 350, as will be illustrated in the following Figures, both forming an insulation for the product to be consumed 31 with respect to the external environment.

In accordance with the invention, the bottom 32 of the receptacle or this preserve 30 is in intimate contact with the closure lid of the heater 5.

For greater clarity in FIG. 1, the bottom 32 and cover 11 are moved slightly away from each other which, in fact, are superimposed. Under these conditions, heating of the product to be consumed is obtained both by conduction and by radiation.

This receptacle or presergve 30, according to an important feature of the invention, has a profile complementary to that of the tray 1 and has at the level of the seal a flat edge 300 providing a tight seal, technically easy to carry out on the periphery 1a of tray 1. These profiles are illustrated in FIGS. 5 to 7 showing, by way of non limitative examples, four variants of sealing the receptacle or preserve 30 containing the food product 31, to the tray 1 through said flat edges 300 on the periphery 1a of this tray 1.

A first variant (FIG. 4) consists in providing a flat edge 300 at the level of receptacle 30, so that it can be bent back at R about the periphery 1a of tray 1 before heat sealing an external lid 350 on the periphery 1a. This heat sealing is carried out on complexed materials.

A second variant (FIG. 5) consists in an over-molding 90 by injection which seals the edges 300 of lid 34 of preserve 30 to the periphery 1a of tray 1.

In a third variant (FIG. 6), the edges of the lid 350 project beyond the periphery, which allows simultaneous sealing of the food receptacle 30 and of the edges of the lid to the tray 1.

Finally, a fourth variant consists in using mechanical crimping 91.

In all cases, so as to complete sealing with the outer environment, a second seal formed for example from wax, mastic or an equivalent material, is formed at the exit of ribbon 20 and of the lid 35, 350.

From the above description the main characteristics of the present invention can be clearly seen.

On the other hand, the thermal contact between the bottom of the food receptacle 30 and the cover 11 allows heat conduction. On the other hand, the materials used for manufacturing the heater 5 and cover 11 are chosen from the range of good conducting materials.

Experience in fact shows that, during the heating cycle up to the heating peak which takes place approximately after 12 to 15 minutes, the emission of steam at 90° to 100° only appears during the first minute of the exothermic reaction. This steam, if it acts alone, is incapable of raising the temperature of the food receptacle under good conditions. On the other hand, in the device of the invention, the expansion of the lime during the reaction, which doubles in volume with respect to the initial volume, is used for further contributing to placing cover 11 in contact with bottom 32. With the temperature of the reactive mixture reaching values close to 300° to 330°, the mass of lime then heats the food receptacle 30 and its contents 31 without difficulty, all conditions being equal (amount of product to be heated, amount of compression of this product . . . ).

Under these conditions knowing the equation of the reaction, the amount of water used may be optimized, all the more so since the member for opening the pocket 9, namely the ribbon 20, through its design and implementation, allows the water to diffuse evenly over the largest possible area of lime. By way of example, the grain size of the lime corresponds to grains greater than a section of 2 millimeters square.

Heating is obtained without it being necessary to destroy the cover 11 even partially, which, on the contrary, maintains its role as separator (in every other respect than that of heat conduction) between the reactive medium and the element to be heated.

Thus, the water vapor is confined as much as possible and contributes, not to heating the food, but on the contrary to promoting correct evolution of the exothermic reaction. This protection by cover 11 mitigates the possible consequences of lime overflow in the case of a mishap in handling.

Finally, the positioning of the cardboard liner 4 and the outer polystyrene packing 3 keeps a maximum of heat inside the tray, which benefits heating, and the user can handle the tray without danger for the heat on the outside of this packing remains lower than 60°.

Such a self heating tray, in accordance with the invention, finds applications not only for use by individuals but also in group catering.

We claim:

1. A food tray including a heating device using an exothermic reaction between two reactive products, comprising:
   a tray element having an open top;
   a heater fitted in said tray element and comprising a heater container, mutually isolated exothermic reactive products fitted in said container and a heat conductive cover hermetically sealing said container;
   a food receptacle fitted in said tray element and having a surface in contact with said cover, whereby conductive heat transfer through said cover and to said food receptacle may be accomplished;
   a lid sealingly closing said open top; and
   means external to said food tray and extending into said heater container for comingling said reactive products to produce an exothermic reaction without damaging a hermetic sealing integrity of said cover, whereby said comingled reactive products are hermetically sealed in said tray element.

2. The tray according to claim 1, wherein said tray element has a peripheral flange, including means for sealing said lid to said flange.

3. The tray according to claim 2, wherein said sealing means comprises the edge of said lid being folded back onto said flange.

4. The tray according to claim 2, wherein said sealing means comprises a heat sealing of said lid, said food receptacle and said flange.

5. The tray according to claim 2, wherein said sealing means comprises an over-molding fitted around said lid and said flange.

6. The tray according to claim 2, wherein said sealing means comprises a metal ring crimped about said flange and said lid.

7. The tray according to claim 1, wherein said heater container has an annular shoulder, including a pocket within which is sealed one of said mutually isolated exothermic reactive products, said pocket having two wings supported by said shoulder, said pocket resting on a bottom of said heater container, and wherein the other of said mutually isolated exothermic reactive products is external to said pocket.

8. The tray according to claim 7, wherein said pocket defines a breakage beginning zone, and wherein said means for comingling comprise a ribbon having one end fixed to said pocket at said breakage beginning zone, said ribbon passing around the bottom of said pocket.

9. The tray according to claim 1, including insulating means on said heater container.

10. The tray according to claim 8, wherein said ribbon passes out of said heater container at a joint between said heater container and said cover, said joint including a seal.

* * * * *